(12) United States Patent
Shah et al.

(10) Patent No.: US 9,172,495 B1
(45) Date of Patent: Oct. 27, 2015

(54) DYNAMIC MODULATION CHANGE WHILE GENERATING A MAC PDU IN A LTE PROTOCOL WIRELESS NETWORK

(71) Applicant: Sprint Communications Company L.P., Overland Park, KS (US)

(72) Inventors: Maulik K. Shah, Overland Park, KS (US); Jasinder Pal Singh, Olathe, KS (US); Siddharth Oroskar, Overland Park, KS (US); John W. Prock, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

(21) Appl. No.: 13/932,605

(22) Filed: Jul. 1, 2013

(51) Int. Cl.
*H04W 4/00* (2009.01)
*H04L 1/00* (2006.01)

(52) U.S. Cl.
CPC ............ *H04L 1/0005* (2013.01); *H04L 1/0009* (2013.01)

(58) Field of Classification Search
CPC . H04L 1/0009; H04L 1/203; H04W 72/0406; H04W 80/04
USPC .......................................... 370/329, 332, 235
See application file for complete search history.

(56) References Cited

U.S. PATENT DOCUMENTS

| | | | |
|---|---|---|---|
| 2009/0046665 A1* | 2/2009 | Robson et al. | 370/332 |
| 2009/0092079 A1* | 4/2009 | Marinier et al. | 370/328 |
| 2009/0161545 A1* | 6/2009 | Ho et al. | 370/235 |
| 2010/0278151 A1* | 11/2010 | Oh et al. | 370/335 |
| 2011/0317642 A1* | 12/2011 | Eravelli et al. | 370/329 |
| 2013/0034076 A1* | 2/2013 | Ketchum et al. | 370/329 |
| 2013/0242909 A1* | 9/2013 | Kim | 370/329 |

FOREIGN PATENT DOCUMENTS

EP 1949584 5/2007

* cited by examiner

*Primary Examiner* — Andrew Chriss
*Assistant Examiner* — Romani Ohri

(57) ABSTRACT

A Long Term Evolution (LTE) protocol evolved Node-B (eNB) and method for dynamic modulation change while generating a Media Access Control (MAC) Protocol Data Unit (PDU) in a LTE wireless network are provided. The eNB in one example embodiment includes a transceiver system configured to receive a packet and a Channel Quality Indicator (CQI) from a User Equipment (UE) and a processing system coupled to the transceiver system and configured to determine whether padding is needed in the MAC PDU, if padding is needed, select a slower modulation scheme and coding rate than is specified by the CQI, wherein the selected slower modulation scheme and coding rate are selected so as to substantially eliminate padding in the MAC PDU, and transmit the MAC PDU using the selected slower modulation scheme and coding rate.

20 Claims, 7 Drawing Sheets

| CQI | Modulation | Coding rate X 1024 | Efficiency | Effective Coding rate |
|---|---|---|---|---|
| 1 | QPSK | 78 | 0.1523 | 0.07617185 |
| 2 | QPSK | 120 | 0.2344 | 0.1171875 |
| 3 | QPSK | 193 | 0.377 | 0.188476563 |
| 4 | QPSK | 308 | 0.6016 | 0.30078125 |
| 5 | QPSK | 449 | 0.877 | 0.438476563 |
| 6 | QPSK | 602 | 1.1758 | 0.587890625 |
| 7 | 16QAM | 378 | 1.4766 | 0.369140625 |
| 8 | 16QAM | 490 | 1.9141 | 0.478515625 |
| 9 | 16QAM | 616 | 2.4063 | 0.6015625 |
| 10 | 64QAM | 466 | 2.7305 | 0.455078125 |
| 11 | 64QAM | 567 | 3.3223 | 0.553710938 |
| 12 | 64QAM | 666 | 3.9023 | 0.650390625 |
| 13 | 64QAM | 772 | 4.5234 | 0.75390625 |
| 14 | 64QAM | 873 | 5.1152 | 0.852539063 |
| 15 | 64QAM | 948 | 5.5547 | 0.92578125 |

FIG. 4

TTI

TTI

DYNAMIC MODULATION CHANGE WHILE GENERATING A MAC PDU IN A LTE PROTOCOL WIRELESS NETWORK

TECHNICAL FIELD

Aspects of the disclosure are related to the field of communications, and in particular, generating a Media Access Control (MAC) Protocol Data Unit (PDU) in a Long Term Evolution (LTE) protocol wireless network.

TECHNICAL BACKGROUND

Wireless communication systems, such as cellular voice and data networks, typically include multiple wireless access nodes spread over a geographic area through which wireless communication devices can register and receive wireless access to communication services. In many examples, the wireless communication devices are mobile, and can move between wireless coverage areas, such as sectors, of the wireless access nodes.

The Long Term Evolution (LTE) protocol (also known as Evolved Universal Terrestrial Radio Access Network, or E-UTRAN) is a wireless communication protocol developed from GSM and 3GPP cellular communication standards. LTE is the first GSM/3GPP standard that is fully IP and packet-based. LTE can be fully integrated into 2G and 3G cellular infrastructure.

LTE was developed to provide improved performance and better spectral efficiency to cellular networks. LTE supports high data rates for services such as voice over IP (VOIP), streaming multimedia, videoconference, and high-speed cellular modem services. LTE supports flexible carrier bandwidths, as well as Time Division Duplex (TDD) and Frequency Division Duplex (FDD) communication modes. LTE was designed with a scalable carrier bandwidth from 1.4 MHz to up to 20 MHz. The bandwidth that is used depends of the frequency band and the amount of spectrum available to a network operator.

LTE uses the concept of a resource block, which is a block of 12 subcarriers in one slot. A transport block is a group of resource blocks with a common modulation/decoding. The physical interface is a transport block, which corresponds to the data carried in an allocated period of time for a particular wireless device in communication with a wireless communication network. Each radio subframe is one millisecond long. Allocations may be valid for one or more Transmission Time Intervals (TTIs), where each TTI is one subframe (i.e., one millisecond).

The MAC layer adds a header and performs padding to fit the MAC SDU into the TTI. The MAC layer submits the MAC PDU to the physical layer for transmitting the MAC PDU onto a physical channel. The physical channel transmits the data into slots of the sub frame.

Overview

Systems, methods, and software for dynamic modulation change while generating a MAC PDU in a LTE wireless network are provided herein. In one example, a method for dynamic modulation change while generating a Media Access Control (MAC) Protocol Data Unit (PDU) in a Long Term Evolution (LTE) protocol wireless network includes receiving in an evolved Node-B (eNB) a packet and a Channel Quality Indicator (CQI) from a User Equipment (UE), determining whether padding is needed in the MAC PDU, and if padding is needed, the eNB selecting a slower modulation scheme and coding rate than is specified by the CQI, wherein the selected slower modulation scheme and coding rate are selected so as to substantially eliminate padding in the MAC PDU, and transmitting the MAC PDU using the selected slower modulation scheme and coding rate.

In another example of a method for dynamic modulation change while generating a MAC PDU in a LTE protocol wireless network includes receiving a packet and a Channel Quality Indicator (CQI) in an evolved Node-B (eNB) from a User Equipment (UE), generating a padded MAC1 comprising the MAC plus padding and a MAC2 comprising the MAC, calculating a MAC1 modulation scheme and coding rate and a MAC2 modulation scheme and coding rate, if the number of MAC1 Resource Blocks (MAC1 RBs) are not equal to the number of MAC2 RBs, then transmitting the MAC PDU using the CQI, and if the number of MAC1 RBs are equal to the number of MAC2 RBs, then: setting the CQI to a next slower CQI, recalculating the MAC2 modulation scheme and coding rate according to the next slower CQI, if the number of MAC1 RBs are equal to the number of MAC2 RBs, then branching back to select a new next slower CQI, and if the number of MAC1 RBs are not equal to the number of MAC2 RBs, then selecting a slower modulation scheme and coding rate as specified by the next slower CQI and transmitting the MAC PDU using the next slower CQI, wherein the selected slower modulation scheme and coding rate are selected so as to substantially eliminate padding in the MAC PDU.

In another example, a LTE protocol evolved Node-B (eNB) for dynamic modulation change while generating a MAC PDU in a LTE wireless network is presented. The eNB includes a transceiver system configured to receive a packet and a Channel Quality Indicator (CQI) from a User Equipment (UE) and a processing system coupled to the transceiver system and configured to determine whether padding is needed in the MAC PDU, if padding is needed, select a slower modulation scheme and coding rate than is specified by the CQI, wherein the selected slower modulation scheme and coding rate are selected so as to substantially eliminate padding in the MAC PDU, and transmit the MAC PDU using the selected slower modulation scheme and coding rate.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 shows an example table of available CQI values.

DETAILED DESCRIPTION

Figure 1:
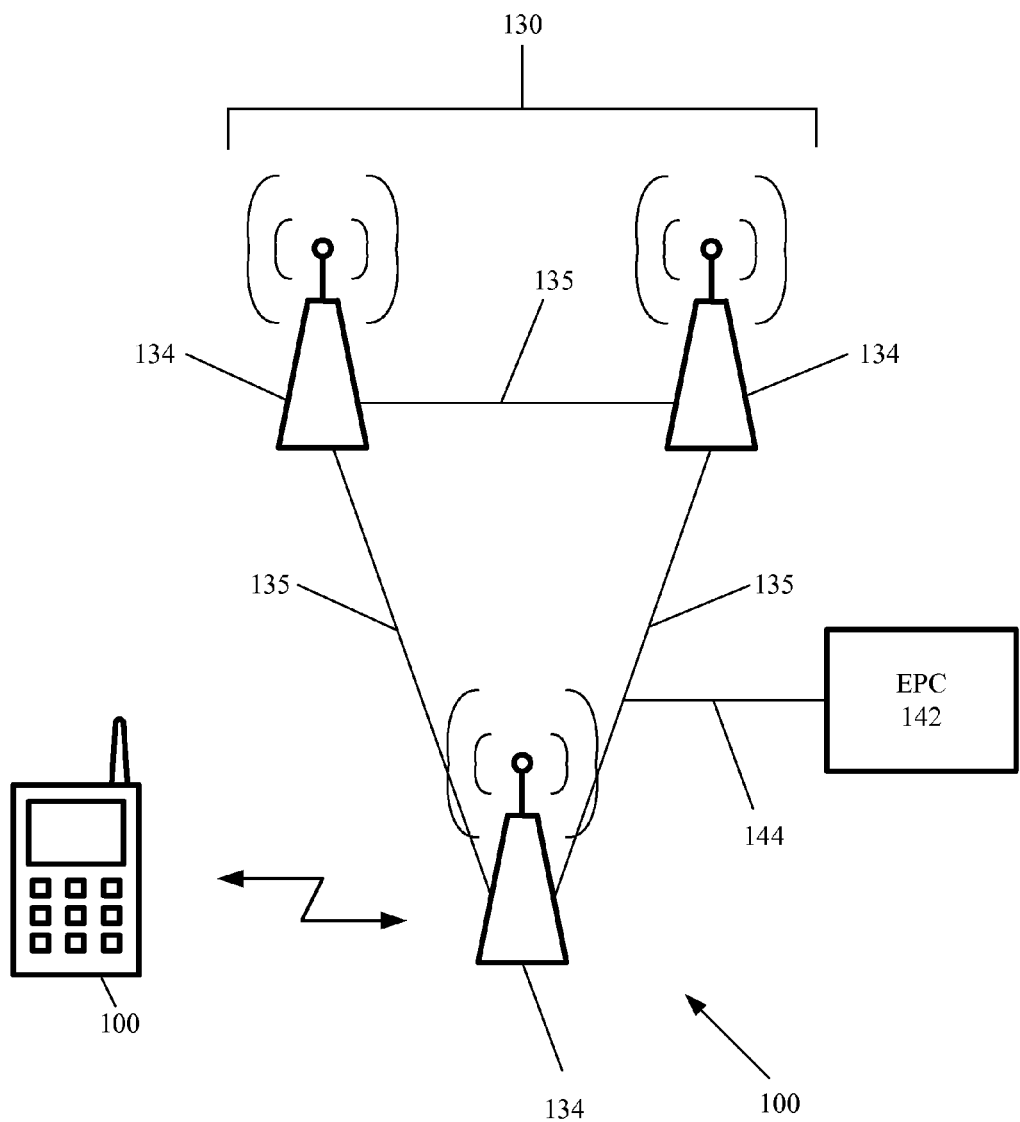
FIG. 1 shows a communication system.

FIG. 1 shows a communication system 100. The communication system 100 includes a User Equipment (UE) 110, a Long Term Evolution (LTE) protocol wireless communication system 130, and an LTE protocol Evolved Packet Core (EPC) 142. The UE 110 comprises a wireless device that is capable of exchanging wireless communications with the wireless communication system 130 via a wireless link or links. The eNBs 134 and the wireless communication network 130 may be capable of generating multiple wireless links and communicating with multiple UEs 110 at any one time. The figure is a high-level view of a LTE or LTE-capable architecture.

Although one main wireless link is shown in the figure, it should be understood that multiple wireless links are possible. The single wireless link is included to show communication modes or wireless access pathways for the UE 110. The wireless links can each use air or space as the transport media. The wireless links can comprise one or more wireless communication links provided over an associated wireless frequency spectrum or wireless frequency band, and can use various protocols. The wireless links can comprise a wireless link such as any version or implementation of the LTE wireless communication protocol. In addition, the wireless links may include other wireless protocols, including other cellular protocols, in addition to LTE, including combinations, improvements, or variations thereof.

The wireless communication system 130 comprises a LTE or LTE-capable communication system. The wireless communication system 130 can include one or more evolved Node-B stations (eNBs) 134. The one or more eNBs 134 may be coupled together by communication links 135. The one or more eNBs 134 may be further coupled to the EPC 142 via a communication link 144. The EPC 142 may be further coupled to other devices or networks, including telephone landlines or Internet links, for example. As a result, communications exchanged between the UE 110 and the wireless communication system 130 may be further provided to other wireless devices within the wireless communication system 130. The communications may be relayed by the EPC 142 to remote devices or networks. It should be understood that where LTE capability is integrated into a cellular telephone network, the eNBs 134 may be included in cellular Base Transceiver Stations (BTSs) and the EPC 142 may be included in a Base Station Controller (BSC) or in a Mobile Switching Center (MSC), for example.

The wireless communication system 130 can provide communication services including voice calls, text messages, data access, or other communication services provided over cellular or wireless communication networks. In some examples, the wireless communication system 130 includes equipment to provide wireless access to communication services within different coverage areas to user devices, route communications between content providers and user devices, and facilitate handoffs between equipment of different coverage areas, among other operations.

The eNBs 134 are capable of communicating with the UE 110, and may be capable of communicating using a variety of frequencies and a variety of communication schemes. An eNB 134 can provide one or more wireless links in some embodiments. An eNB 134 can provide a sector of wireless coverage in some embodiments. Although three eNBs 134 are shown, it would be understood that any number of eNBs 134 could be included in the wireless communication system 130. The number of eNBs 134 may vary due to terrain and obstacles, number of expected users, desired sector sizes, and other factors.

The eNBs 134 each comprise RF communication and control circuitry, transceivers, and antennas, as well as wireless communications equipment capable of communicating with and providing wireless access within a wireless coverage area to communication services for wireless communication devices, such as the UE 110. The RF communication circuitry typically includes amplifiers, filters, RF modulators, transceivers, and signal processing circuitry. The eNBs 134 may include processing equipment, routing equipment, and physical structures. The eNBs 134 may include transceiver and antenna equipment for exchanging wireless communications with UEs 110 in a sector of wireless coverage. Further equipment, networks, and/or systems can be communicatively coupled to the eNBs 134 and/or the EPC 142, such as equipment, networks, and systems of cellular voice and data communication systems (not shown for clarity). It should be understood that the eNB 134 could be distributed or consolidated among equipment or circuitry that together forms the elements of the eNB 134. The eNB 134 can optionally include additional devices, features, or functionality not discussed herein for the purpose of brevity.

The UE 110 may be a mobile device, including a cellular phone, but also may include other devices. The UE 110 may include one or more transceiver portions for communication over one or more wireless links of differing frequency bands. The UE 110 can receive wireless access information from one or more of the eNBs 134, such as beacon signals, channel information, frequency information, overhead signaling, neighbor lists, and the like. The UE 110 can move among any of the coverage areas associated with the wireless communication system 130 and receive wireless access.

The UE 110 can include one or more antennas, transceiver circuitry elements, and communication elements. The transceiver circuitry typically includes amplifiers, filters, modulators, and signal processing circuitry. The UE 110 can also include user interface systems, memory devices, non-transitory computer-readable storage mediums, software, processing circuitry, or some other communication components. The UE 110 can comprise subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

The UE 110 can monitor wireless conditions in relation to the wireless communication system 130, including signal strength, signal to noise ratio, signal to interference ration, energy to interference ratio, or other indicator of signal strength or signal quality. Consequently, the UE 110 can transmit a Channel Quality Indicator (CQI) to the wireless communication system 130. The CQI comprises information regarding communications between the UE 110 and the wireless communication system 130.

Figure 2:
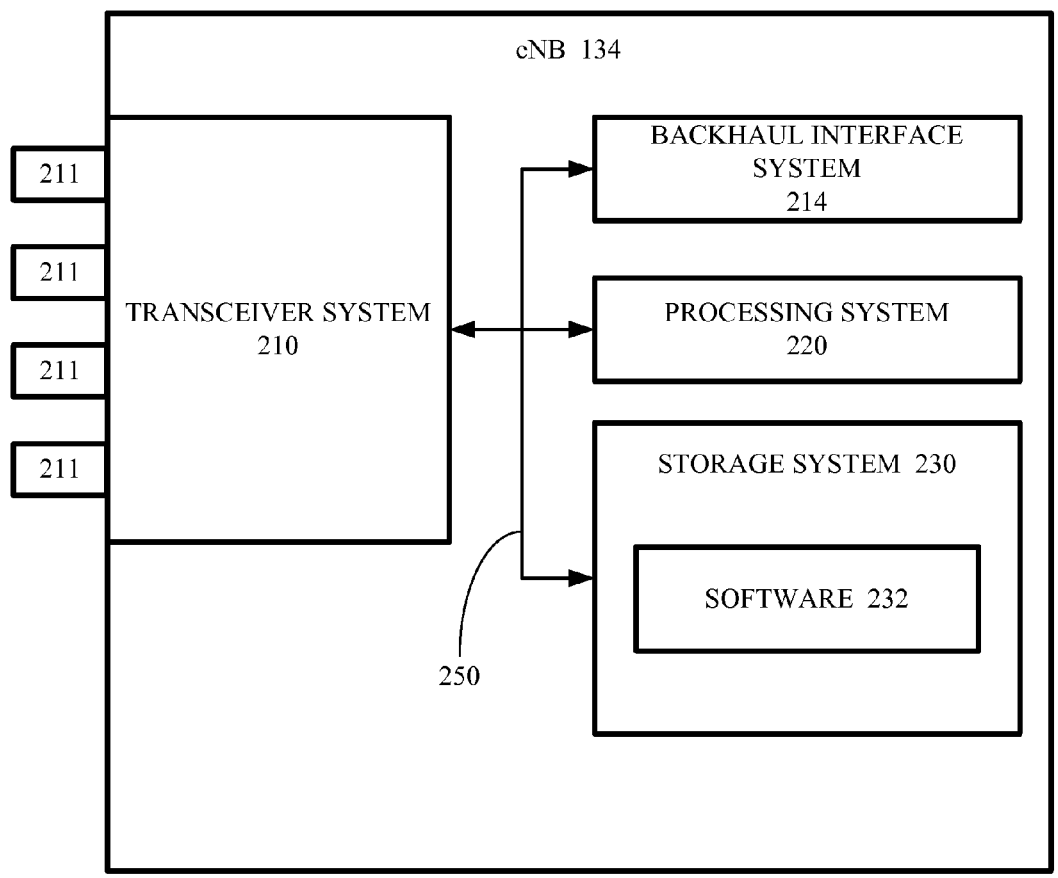
FIG. 2 is a block diagram of a LTE-protocol eNB according to an embodiment of the invention.

FIG. 2 is a block diagram of a LTE-protocol eNB 134 according to an embodiment of the invention. The eNB 134 includes a transceiver system 210, transceiver nodes 211, a backhaul interface system 214, a processing system 220, and a storage system 230. In operation, the processing system 220 is operatively linked to the transceiver system 210, the backhaul interface system 214, and the storage system 230 by a bus 250. It should be understood that alternatively discrete links can be employed, such as network links or other circuitry. The eNB 134 can be distributed or consolidated among the equipment or circuitry that together forms the elements of the eNB 134. The eNB 134 can optionally include additional devices, features, or functionality not discussed here for purposes of brevity.

The transceiver system 210 comprises one or more communication interfaces for communicating with one or more UEs 110, namely the transceiver nodes 211. The transceiver system 210 receives command and control information and instructions from the processing system 220 or the backhaul interface system 214 for controlling the operations of the transceiver nodes 211 and the UE 110 over wireless links, coordinating handoffs of the UEs 110 between other wireless access systems, exchanging authentication or authorization information with other wireless communication networks, providing parameters to one or more UEs 110, transferring neighbor list information, and transferring communications for delivery to the UE 110. The wireless link can use various protocols or communication formats as described herein, including combinations, variations, or improvements thereof.

The transceiver nodes 211 each include transceiver equipment for wirelessly exchanging user communications and overhead communications with user devices, omitted for clarity, using antenna arrays and the associated wireless links. The transceiver nodes 211 can comprise one or more antenna elements, RF coupling equipment, structural supports, cabling, or other equipment. In some examples, elements of the transceiver nodes 211 can comprise a directed antenna array, such as a yagi antenna, dish antenna, parabolic antenna, or phased antenna array to establish beam forming during transmissions to user devices.

The backhaul interface system 214 includes a network interface for communicating with one or more communication networks, such as the wireless communication system 130, among others. The network interface can include a T1 interface, or local or wide area network communication interfaces which can communicate over one or more Ethernet or Internet protocol (IP) links. Examples of the backhaul interface system 214 include network interface card equipment, transceivers, modems, and other communication circuitry. The backhaul interface system 214 can communicate with other devices of the wireless communication network 130 via a wire or wireless links. In addition, the backhaul interface system 214 can communicate with devices external to the wireless communication network 130, including via wire or wireless links. The links can use various protocols or communication formats as described herein for the wireless link to the UE 110, including combinations, variations, or improvements thereof.

The processing system 220 can comprise one or more microprocessors and other circuitry that retrieves and executes the software 232 from the storage system 230. The processing system 220 can be implemented within a single processing device but can also be distributed across multiple processing devices or sub-systems that cooperate in executing program instructions. Examples of the processing system 220 include general purpose central processing units, application specific processors, and logic devices, as well as any other type of processing device, combinations, or variations thereof.

The storage system 230 can comprise any computer readable storage media readable by the processing system 220 and capable of storing the software 232. The storage system 230 can include volatile and nonvolatile, removable and non-removable media implemented in any method or technology for storage of information, such as computer readable instructions, data structures, program modules, or other data.

In addition to storage media, in some implementations the storage system 230 can also include communication media over which the software 232 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The software 232 can be implemented in program instructions and among other functions which can, when executed by the eNB 134 in general or the processing system 220 in particular, operates to direct the eNB 134 or the processing system 220 to exchange communications with UE devices 110 over one or more transceiver nodes, among other operations. In some embodiments, the software 232 when executed by the eNB 134 in general or the processing system 220 in particular operates to direct the eNB 134 or the processing system 220 to receive in an eNB 134 a packet and a CQI from a UE 110, determining whether padding is needed in the MAC PDU, and if padding is needed, the eNB 134 selecting a slower modulation scheme and coding rate than is specified by the CQI, wherein the selected slower modulation scheme and coding rate are selected so as to substantially eliminate padding in the MAC PDU, and transmitting the MAC PDU using the selected slower modulation scheme and coding rate. In some embodiments, the software 232 when executed by the eNB 134 in general or the processing system 220 in particular operates to direct the eNB 134 or the processing system 220 to receiving in an eNB 134 a packet from a UE 110, receiving in the eNB 134 a CQI from the UE 110, generating a padded MAC1 comprising the MAC plus padding and a MAC2 comprising the MAC, calculating a MAC1 modulation scheme and coding rate and a MAC2 modulation scheme and coding rate, if the number of MAC1 Resource Blocks (MAC1 RBs) are not equal to the number of MAC2 RBs, then transmitting the MAC PDU using the CQI, and if the number of MAC1 RBs are equal to the number of MAC2 RBs, then: setting the CQI to a next slower CQI, recalculating the MAC2 modulation scheme and coding rate according to the next slower CQI, if the number of MAC1 RBs are equal to the number of MAC2 RBs, then branching back to select a new next slower CQI, and if the number of MAC1 RBs are not equal to the number of MAC2 RBs, then selecting a slower modulation scheme and coding rate as specified by the next slower CQI and transmitting the MAC PDU using the next slower CQI, wherein the selected slower modulation scheme and coding rate are selected so as to substantially eliminate padding in the MAC PDU.

The software 232 can include additional processes, programs, or components, such as operating system software, database software, or application software. The software 232 can also comprise firmware or some other form of machine-readable processing instructions executable by the processing system 220. In at least one implementation, the program instructions can include first program instructions that direct the processing system 220 to exchange communications with the wireless UE devices over one or more transceiver nodes, among other operations.

In general, the software 232 can, when loaded into the processing system 220 and executed, transform the processing system 220 into a special-purpose computing system configured to exchange communications with UE devices 110 over one or more transceiver nodes, among other operations. Encoding the software 232 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the software 232 can transform the physical state of the semiconductor memory when the program is encoded therein. For example, the software 232 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 3:
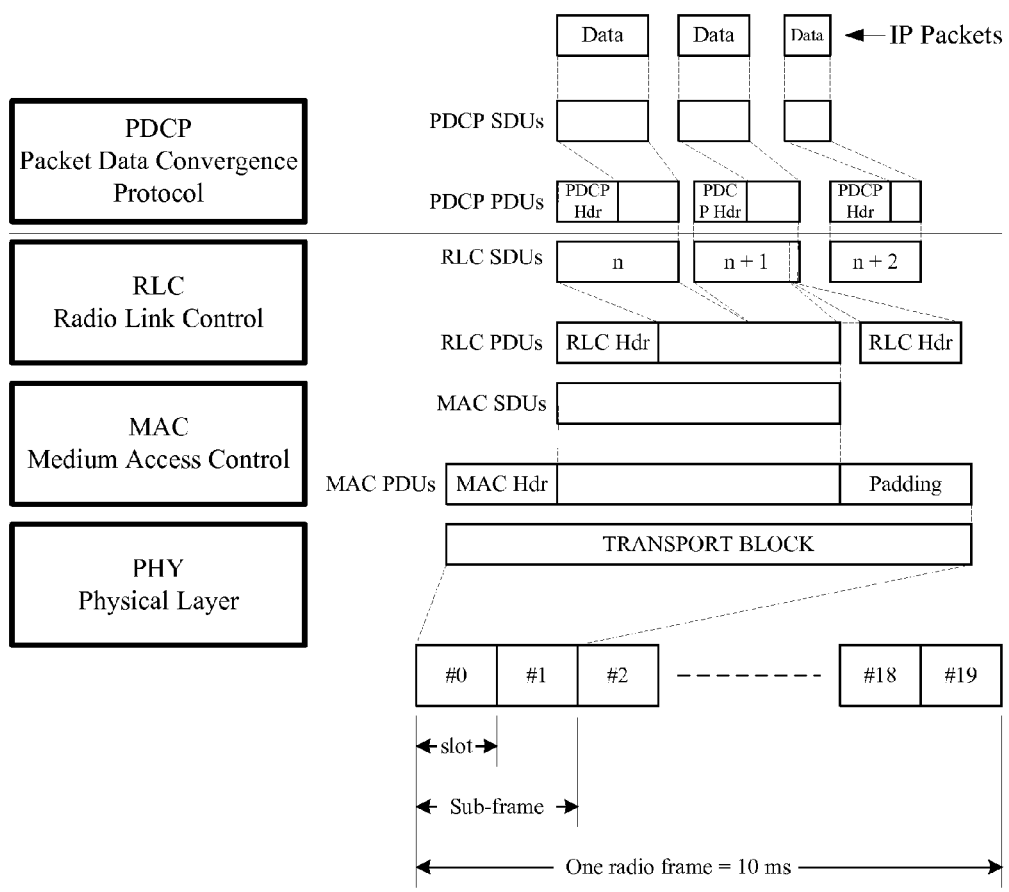
FIG. 3 shows a time domain view of a LTE downlink protocol stack.

FIG. 3 shows a time domain view of a LTE downlink protocol stack. The Long Term Evolution (LTE) protocol (also known as Evolved Universal Terrestrial Radio Access Network, or E-UTRAN) is a wireless communication protocol developed from GSM and 3GPP cellular communication standards. LTE is the first GSM/3GPP standard that is fully IP and packet-based. As a result, LTE can be fully integrated into 2G and 3G cellular infrastructure. This enables seamless handoffs and complete connectivity between LTE and previous standards.

The LTE physical layer is unique because it has asymmetrical modulation and data rates for uplink and downlink. The standard is designed for full-duplex operation, with simultaneous transmission and reception. LTE can provide for a downlink speed of up to 150 megabits per second (Mbps) and an uplink speed of up to 50 Mbps. The radio is optimized for performance on the downlink because the transmitter at the base station has plenty of power. On the uplink, the radio is optimized more for power consumption than efficiency in view of available mobile device battery power.

LTE was developed to provide improved performance and better spectral efficiency to cellular networks. LTE supports high data rates for services such as voice over IP (VOIP), streaming multimedia, videoconference, and high-speed cellular modem services. LTE supports flexible carrier bandwidths, as well as Time Division Duplex (TDD) and Frequency Division Duplex (FDD) communication modes. LTE was designed with a scalable carrier bandwidth from 1.4 MHz to up to 20 MHz. The bandwidth that is used depends of the frequency band and the amount of spectrum available to a network operator.

LTE uses the concept of a resource block, which is a block of 12 subcarriers in one slot. A transport block is a group of resource blocks with a common modulation/decoding. The physical interface is a transport block, which corresponds to the data carried in an allocated period of time for the particular UE 110. Each radio subframe is one millisecond long. Each frame is ten milliseconds long. Multiple UEs 110 can be serviced on the downlink at any particular time in one transport block. Allocations may be valid for one or more Transmission Time Intervals (TTIs), where each TTI is one subframe (i.e., one millisecond). Each subframe (or TTI) comprises two Resource Blocks (RBs) of 0.5 millisecond in length.

It can be seen from FIG. 3 that the LTE protocol stack has four layers: the PDCP layer (Packet Data Convergence Protocol), the RLC layer (Radio Link Control), the MAC layer (Media (or Medium) Access Control), and the PHY layer (physical layer). At the bottom of the protocol stack are the radio frames (frames 0-19 are shown).

Packets that are received by a layer of the protocol stack are referred to as Service Data Units (SDUs). Packets that are outputted by a layer are referred to as Protocol Data Units (PDUs). IP packets flow from top to bottom layers in the figure.

At the top of the protocol layers of FIG. 3, the IP layer submits PDCP SDUs (i.e., IP packets) to the PDCP layer. The PDCP layer does header compression and adds a PDCP header to the PDCP SDUs. The PDCP layer submits the PDCP PDUs (i.e., RLC SDUs) to the RLC layer. The PDCP layer removes the IP header (a minimum of 20 bytes) from the PDU and adds a token of 1-4 bytes. The use of the token provide saving in the amount of header that would otherwise have to go over the air. The RLC layer does segmentation of the SDUs to make the RLC PDUs. The RLC adds a header based on the RLC mode of operation. The RLC submits the RLC PDUs (MAC SDUs) to the MAC layer.

A full frame is ten milliseconds long, but the more basic unit of time is the one millisecond subframe, which contains the transport block. If the RLC SDU is large, or if the available radio data rate is low (resulting in small transport blocks), the RLC SDU may be split among several RLC PDUs. If the RLC SDU is small, or the available radio data rate is high, several RLC SDUs may be packed into a single PDU.

The MAC layer controls what to send in a given time. It also performs the transport as a logical mapping—a function that breaks down different logical channels out of the transport block for the higher layers. Format selection and measurements provide information about the network that is needed for managing the entire network to the radio resource control.

Within the transport block is the MAC header and any extra space (i.e., padding). Within that, there is the RLC header, then within the RLC header there can be a number of PDCPs.

Logical channels exist at the top of the MAC layer. They represent data transfer services offered by the MAC and are defined by the type of information they carry. Types of logical channels include control channels (for the control plane data) and the traffic channels (for the user plane data).

Transport channels are in the transport blocks at the bottom of the MAC. They represent data transfer services offered by the PHY and are defined by how the information is carried, different physical layer modulations, and they way they are encoded. The transport channels use different modulations and codings.

The MAC layer adds a header and performs padding to fit the MAC SDU into the TTI. The MAC layer submits the MAC PDU to the physical layer for transmitting the MAC PDU onto a physical channel. The physical channel transmits the data into slots of the sub frame.

The format selection process prepares the physical layer for the coding and modulation of the next transport block. The eNB 134 includes information in each transport block that specifies the format using a Modulation Coding Scheme (MCS) for the next transport block. The MCS can change dynamically. The MAC configures the PHY for the next Transport Block (TB).

The MAC determines the transport format—how to use it, how to pack the information in, and what modulation and coding are available and configure the PHY appropriately to be ready to transmit. Format variables are the modulation and coding to be used, which together or singly determine the actual data rate employed in transmission. The MAC determines the capacity of a transport block based on the transport format.

A Channel Quality Indicator (CQI) may be received from the UE 110. The CQI comprises information sent from the UE 110 to the eNB 134 to indicate a suitable downlink transmission data rate, i.e., may include a Modulation and Coding Scheme (MCS) value. The CQI may comprise a 4-bit integer in some embodiments and may be based on the detected signal-to-interference-plus-noise ratio (SINR) at the UE 110. The CQI estimation process takes into account the capability of the UE 110, such as the number of antennas and the type of receiver used for detection. The CQI reported values are used by the eNB 134 for downlink scheduling and link adaptation.

FIG. 4 shows an example table of available CQI values. The CQI may include a modulation scheme, such as QPSK, 16QAM, and 64QAM, as shown in the figure. The CQI may additionally include a coding rate, an efficiency, and an effective coding rate. It should be understood that other or additional information may be included in the CQI.

In the prior art, a modulation scheme and effective coding rate have been chosen according to the information provided in the CQI. As a result, because the outgoing MAC PDUs must fit into a Transmission Time Interval (TTI) of the transport block, the MAC PDU may need to be padded.

However, instead of padding, the eNB 134 according to embodiments of the invention instead may dynamically change the modulation scheme and coding rate to fill the TTI, without resorting to padding the MAC PDU. The eNB 134 may instead choose a modulation scheme and coding rate that transmits the MAC PDU at a slower speed. The advantage is that by transmitting at a slower speed, the transmission is likely to have a lower Bit Error Rate (BER).

Figure 5:
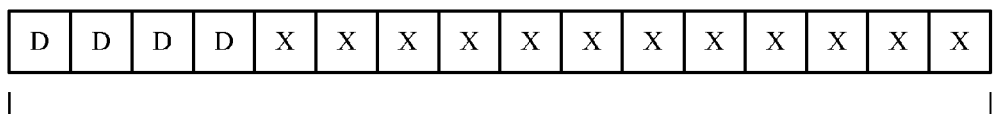
FIG. 5 shows a PDU transmitted with padding bits included.

FIG. 5 shows a PDU transmitted with padding bits included. Each bit time may be fixed in length according to a modulation scheme and coding rate of a received CQI.

Figure 6:
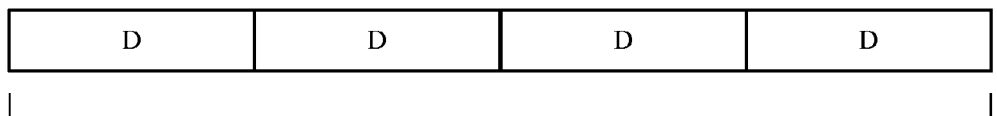
FIG. 6 shows a PDU according to any of the embodiments of the invention.

FIG. 6 shows a PDU according to any of the embodiments of the invention. In this figure, the modulation scheme and/or coding rate have been dynamically changed to eliminate padding.

Figure 7:
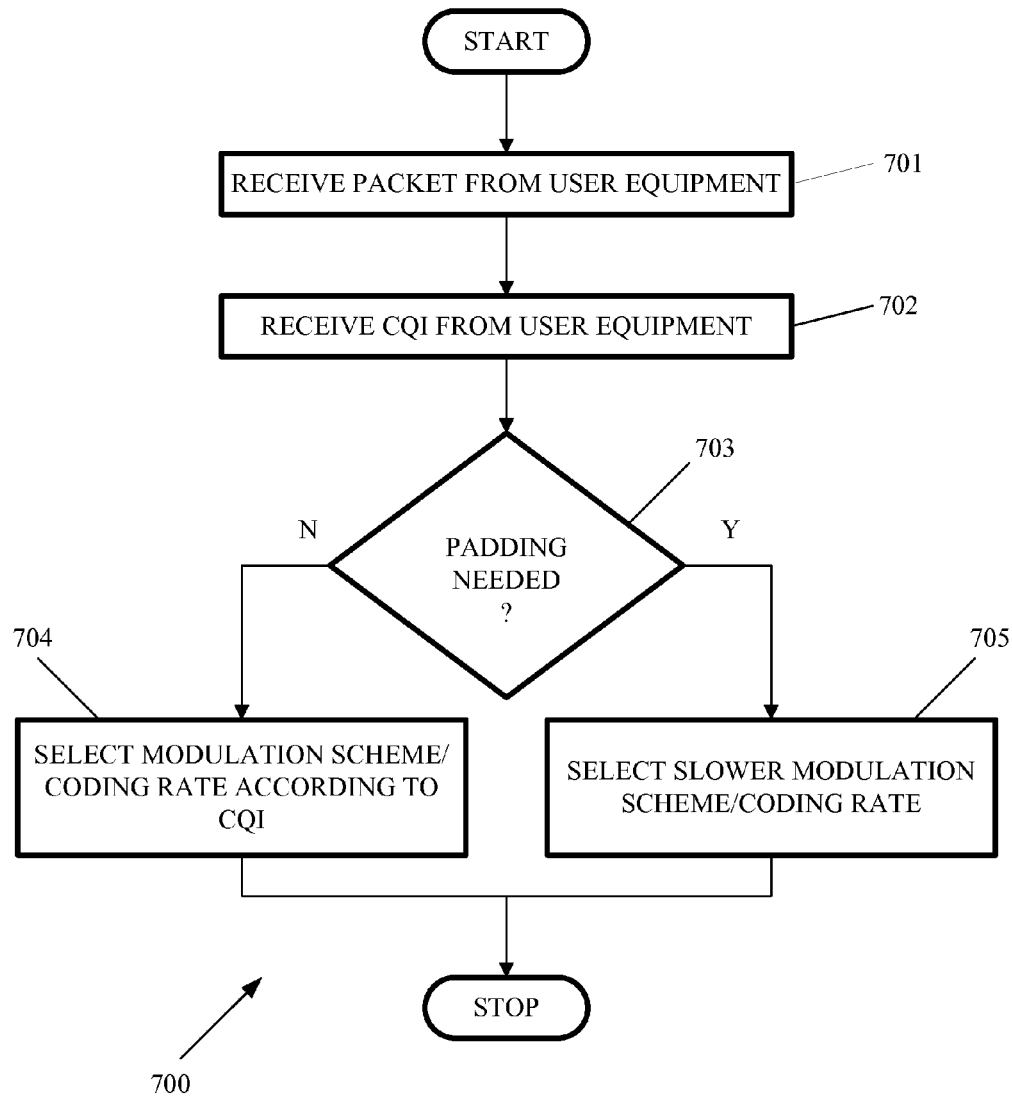
FIG. 7 is a flowchart of a method for dynamic modulation change while generating a Media Access Control (MAC) layer Protocol Data Unit (PDU) in a Long Term Evolution (LTE) protocol wireless network.

FIG. 7 is a flowchart 700 of a method for dynamic modulation change while generating a Media Access Control (MAC) layer Protocol Data Unit (PDU) in a Long Term Evolution (LTE) protocol wireless network. A MAC PDU comprises an outgoing data unit of an eNB node of the LTE wireless network. The MAC PDU is relayed from the UE to a destination by the eNB. In step 701, a packet is received in the eNB from the UE. The packet is received and processed as a Service Data Unit (SDU), wherein the SDU is transformed into a PDU and the PDU is subsequently transformed into a Transport Block (TB). The length of the TB corresponds to a Transmission Time Interval (TTI). The TB is then inserted into a radio subframe.

In step 702, a CQI is obtained. The CQI has been received from the UE at some point in time. The CQI may be received substantially concurrently with the received packet, or may be received independently from the UE, such as at a previous time. The CQI includes a measurement or measurements of signal strength, as measured in the UE.

In some embodiments, the eNB may generate a Modulation Coding Scheme (MCS) from the received CQI. The MCS may include a selected modulation scheme and coding rate. In some embodiments, the selected modulation scheme and coding rate comprise a fastest possible modulation scheme and coding rate, wherein the TB will be transmitted as quickly as it can be transmitted.

In step 703, the MAC layer determines whether padding will be needed in the PDU. Padding will be needed if the data bits or bytes do not fill up the PDU. If padding is not needed, the method branches to step 704. Otherwise, where padding is needed, the method branches to step 705.

In step 704, where padding is not needed, a modulation scheme and coding rate are selected according to the information in the CQI/MCS. The method then exits.

In step 705, where padding is needed, then instead of padding, a slower modulation scheme and coding rate are selected. The slower modulation scheme and coding rate comprises a slower modulation scheme and coding rate than is specified by the information in the CQI/MCS. Padding is therefore rendered unnecessary through use of the slower modulation scheme and coding rate.

In some embodiments, the selected slower modulation scheme and coding rate are selected to eliminate padding in the PDU. In some embodiments, the slower modulation scheme and coding rate are used to fill a Transmission Time Interval (TTI) of the PDU. In some embodiments, the slower modulation scheme and coding rate result in longer bit times within the PDU. In some embodiments, the slower modulation scheme and coding rate are used to transmit only data bits in the PDU. Advantageously, the use of the slower modulation scheme and coding rate may achieve a lower Bit Error Rate (BER).

Figure 8:
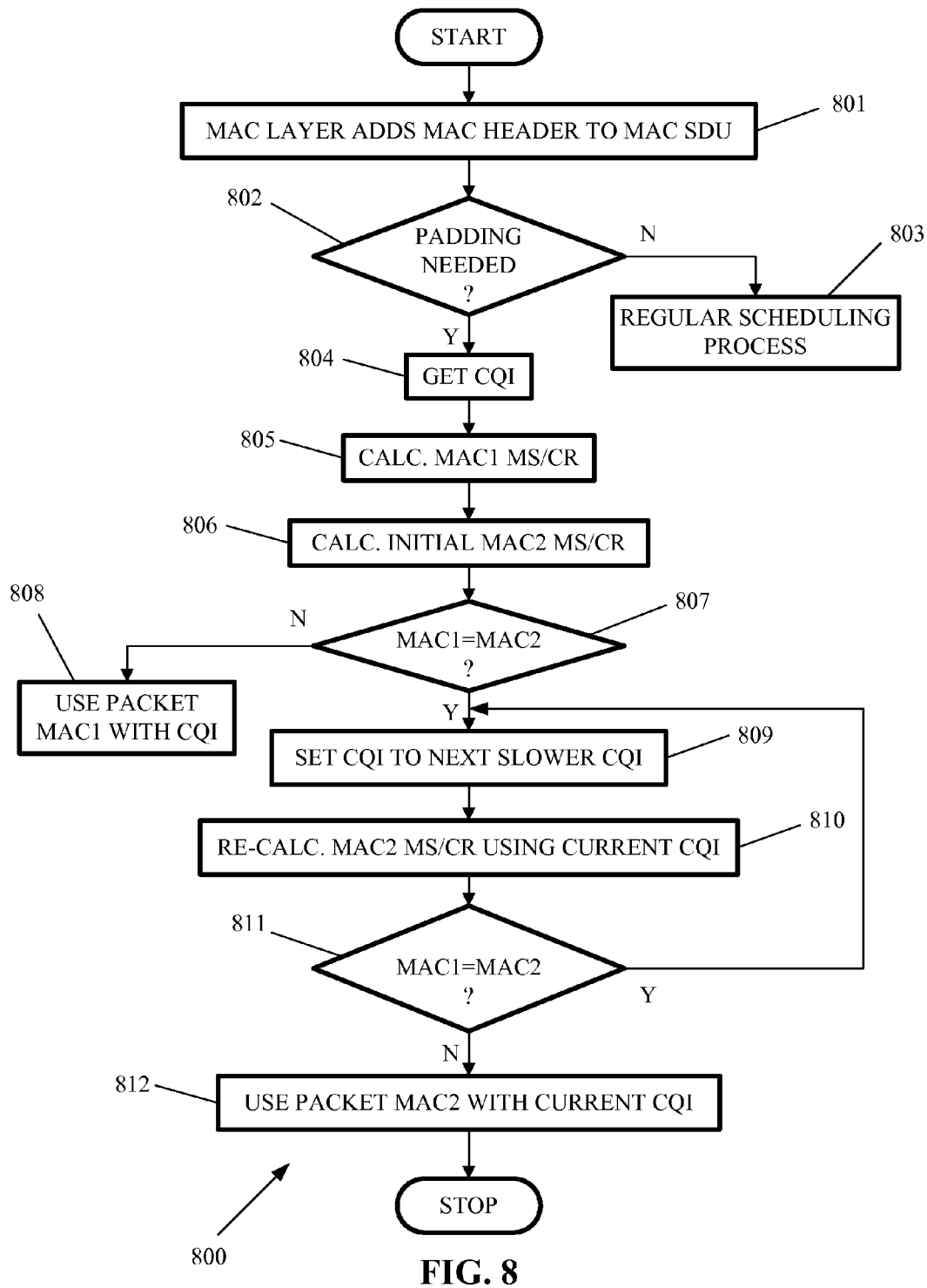
FIG. 8 is a flowchart of a method for dynamic modulation change while generating a MAC PDU in a LTE protocol wireless network.

FIG. 8 is a flowchart 800 of a method for dynamic modulation change while generating a MAC PDU in a LTE protocol wireless network. In step 801, the MAC layer of the eNB adds a MAC header to the MAC PDU as part of forming a TB (the IP packet/SDU has already been received).

In step 802, the MAC layer determines whether padding will be needed in the MAC PDU, as previously discussed. If padding is not needed, the method branches to step 803. Otherwise, where padding is needed, the method branches to step 804.

In step 803, where padding is not required, the TB (comprising the MAC PDU) is transmitted using a regular scheduling process. The method then exits (it should be understood that the flowchart 800 may be iteratively performed for all subsequently received packets).

In step 804, where padding is required, a CQI is obtained, as previously discussed. The CQI may be currently or previously received from the UE.

In step 805, a MAC1 is generated, with the MAC1 comprising the MAC packet with padding. In addition, a MAC1 modulation scheme (MS) and coding rate (CR) are calculated using the received CQI.

In step 806, a MAC2 is generated, with the MAC2 comprising the MAC packet without padding. In addition, a MAC2 modulation scheme and coding rate is calculated using the received CQI.

In step 807, the MAC1 is compared to the MAC2. The comparison determines whether the padding operation added Resource Blocks (RBs) to the padded MAC1 version. If the padding added RBs, then the MAC1 version will not equal the MAC2 in the number of RBs (i.e., MAC1 may be larger, due to the padding) and a change in CQI will be used instead of padding. If MAC1 is not equal to MAC2, then the method branches to step 808. Otherwise, if MAC1 is equal to MAC2, then the method branches to step 809.

In step 808, where MAC1 is not equal to MAC2, the received CQI is used to transmit the padded MAC1 packet as the MAC PDU (i.e., here the padded MAC1 does not require more RBs than the unpadded MAC1).

In step 809, where MAC1 is equal to MAC2, the CQI is set to a next slower CQI.

In step 810, the MAC2 modulation scheme and coding rate is recalculated using the current CQI. As a result, the modulation scheme and coding rate are set to a next slower modulation scheme and coding rate than for the previous CQI.

In step 811, the MAC1 modulation scheme and coding rate is compared to the MAC2 modulation scheme and coding rate. If MAC1 is equal to MAC2, then the method branches to step 809, wherein the CQI may be iteratively changed (i.e., the method branches back to select a new next slower CQI) until a suitable CQI is found. Otherwise, if MAC1 is not equal to MAC2, then the method branches to step 812.

In step 812, where MAC1 is not equal to MAC2, the MAC2 packet is transmitted as the MAC PDU, using the current CQI.

In this manner, the method may iteratively reduce the CQI to slower and slower modulation schemes and coding rates until a suitable CQI is found that eliminates padding in the MAC PDU.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A Long Term Evolution (LTE) protocol evolved Node-B (eNB) for dynamic modulation change while generating a Media Access Control (MAC) Protocol Data Unit (PDU) in a LTE wireless network, comprising:
    a transceiver system configured to receive a packet and a Channel Quality Indicator (CQI) from a User Equipment (UE), wherein the CQI is associated with a modulation scheme and coding rate; and
    a processing system coupled to the transceiver system and configured to determine whether padding is needed in the MAC PDU, if padding is needed, select a slower modulation scheme and coding rate than the associated modulation scheme and coding rate specified by the CQI, wherein the selected slower modulation scheme and coding rate are selected so as to eliminate padding in the MAC PDU, and transmit the MAC PDU using the selected slower modulation scheme and coding rate.

2. The eNB of claim 1, wherein the processing system is configured to generate a padded MAC1 comprising the MAC PDU plus padding and a MAC2 comprising the MAC PDU (without padding), calculate a MAC1 modulation scheme and coding rate and a MAC2 modulation scheme and coding rate, if the number of MAC1 Resource Blocks (MAC1 RBs) are not equal to the number of MAC2 RBs, then transmit the MAC PDU using the CQI, and if the number of MAC1 RBs are equal to the number of MAC2 RBs, then: set the CQI to a next slower CQI, recalculate the MAC2 modulation scheme and coding rate according to the next slower CQI, if the number of MAC1 RBs are equal to the number of MAC2 RBs, then branch back to select a new next slower CQI, and if the number of MAC1 RBs are not equal to the number of MAC2 RBs, then select a slower modulation scheme and coding rate as specified by the next slower CQI and transmit the MAC PDU using the next slower CQI, wherein the selected slower modulation scheme and coding rate are selected so as to eliminate padding in the MAC PDU.

3. The eNB of claim 1, wherein the eNB dynamically changes the modulation scheme and coding rate based on a MAC PDU padding requirement.

4. The eNB of claim 1, wherein if padding is not needed, the eNB selects the modulation scheme and coding rate specified by the CQI.

5. The eNB of claim 1, wherein the selected slower modulation scheme and coding rate are used to fill a Transmission Time Interval (TTI) of the MAC PDU and wherein the selected slower modulation scheme and coding rate result in longer bit times within the MAC PDU.

6. The eNB of claim 1, wherein the selected slower modulation scheme and coding rate are used to transmit only data bits in the MAC PDU and to achieve a lower Bit Error Rate (BER).

7. The eNB of claim 1, wherein the packet and the CQI may be received at the same or different times.

8. A method for dynamic modulation change while generating a Media Access Control (MAC) Protocol Data Unit (PDU) in a Long Term Evolution (LTE) protocol wireless network, the method comprising:
    receiving a packet and a Channel Quality Indicator (CQI) in an evolved Node-B (eNB) from a User Equipment (UE), wherein the CQI is associated with a modulation scheme and coding rate;
    determining whether padding is needed in the MAC PDU; and
    if padding is needed, the eNB selecting a slower modulation scheme and coding rate than the associated modulation scheme and coding rate specified by the CQI, wherein the selected slower modulation scheme and coding rate are selected so as to eliminate padding in the MAC PDU, and transmitting the MAC PDU using the selected slower modulation scheme and coding rate.

9. The method of claim 8, wherein the eNB dynamically changes the modulation scheme and coding rate based on a MAC PDU padding requirement.

10. The method of claim 8, wherein if padding is not needed, the eNB selects the modulation scheme and coding rate specified by the CQI.

11. The method of claim 8, wherein the selected slower modulation scheme and coding rate are used to fill a Transmission Time Interval (TTI) of the MAC PDU and wherein the selected slower modulation scheme and coding rate result in longer bit times within the MAC PDU.

12. The method of claim 8, wherein the selected slower modulation scheme and coding rate are used to transmit only data bits in the MAC PDU and to achieve a lower Bit Error Rate (BER).

13. The method of claim 8, wherein the packet and the CQI may be received at the same or different times.

14. The method of claim 8, with the determining and selecting comprising:
    generating a padded MAC1 comprising the MAC PDU plus padding and a MAC2 comprising the MAC PDU without padding;
    calculating a MAC1 modulation scheme and coding rate and a MAC2 modulation scheme and coding rate;
    if the number of MAC1 Resource Blocks (MAC1 RBs) are not equal to the number of MAC2 RBs, then transmitting the MAC PDU using the CQI; and if the number of MAC1 RBs are equal to the number of MAC2 RBs, then:
setting the CQI to a next slower CQI;
recalculating the MAC2 modulation scheme and coding rate according to the next slower CQI;
if the number of MAC1 RBs are equal to the number of MAC2 RBs, then branching back to select a new next slower CQI; and
if the number of MAC1 RBs are not equal to the number of MAC2 RBs, then selecting a slower modulation scheme and coding rate as specified by the next slower CQI and transmit the MAC PDU using the next slower CQI, wherein the selected slower modulation scheme and coding rate are selected so as to eliminate padding in the MAC PDU.

15. A method for dynamic modulation change while generating a Media Access Control (MAC) Protocol Data Unit (PDU) in a Long Term Evolution (LTE) protocol wireless network, the method comprising:
receiving a packet and a Channel Quality Indicator (CQI) in an evolved Node-B (eNB) from a User Equipment (UE), wherein the CQI is associated with a modulation scheme and coding rate;
generating a padded MAC1 comprising the MAC PDU plus padding and a MAC2 comprising the MAC PDU without padding;
calculating a MAC1 modulation scheme and coding rate and a MAC2 modulation scheme and coding rate;
if the number of MAC1 Resource Blocks (MAC1 RBs) are not equal to the number of MAC2 RBs, then transmitting the MAC PDU using the CQI; and
if the number of MAC1 RBs are equal to the number of MAC2 RBs, then:
setting the CQI to a next slower CQI;
recalculating the MAC2 modulation scheme and coding rate according to the next slower CQI;
if the number of MAC1 RBs are equal to the number of MAC2 RBs, then branching back to select a new next slower CQI; and
if the number of MAC1 RBs are not equal to the number of MAC2 RBs, then selecting a slower modulation scheme and coding rate as specified by the next slower CQI and transmitting the MAC PDU using the next slower CQI, wherein the selected slower modulation scheme and coding rate are selected so as to eliminate padding in the MAC PDU.

16. The method of claim 15, wherein the eNB dynamically changes the modulation scheme and coding rate based on a MAC PDU padding requirement.

17. The method of claim 15, wherein if padding is not needed, the eNB selects the modulation scheme and coding rate specified by the CQI.

18. The method of claim 15, wherein the selected slower modulation scheme and coding rate are used to fill a Transmission Time Interval (TTI) of the MAC PDU and wherein the selected slower modulation scheme and coding rate result in longer bit times within the MAC PDU.

19. The method of claim 15, wherein the selected slower modulation scheme and coding rate are used to transmit only data bits in the MAC PDU and to achieve a lower Bit Error Rate (BER).

20. The method of claim 15, wherein the packet and the CQI may be received at the same or different times.

* * * * *